United States Patent
Liu et al.

(10) Patent No.: US 9,210,003 B2
(45) Date of Patent: Dec. 8, 2015

(54) DOWNLINK CHANNEL ESTIMATION METHOD, SYSTEM, AND MOBILE TERMINAL

(71) Applicant: Huawei Technologies Co., Ltd., Shenzhen, Guangdong (CN)

(72) Inventors: Sheng Liu, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 14/290,350

(22) Filed: May 29, 2014

(65) Prior Publication Data
US 2014/0286185 A1    Sep. 25, 2014

Related U.S. Application Data

(63) Continuation of application No. PCT/CN2012/085445, filed on Nov. 28, 2012.

(30) Foreign Application Priority Data

Nov. 29, 2011    (CN) .......................... 2011 1 0387466

(51) Int. Cl.
*H04L 25/02* (2006.01)
*H04L 25/03* (2006.01)
*H04L 27/26* (2006.01)

(52) U.S. Cl.
CPC ...... *H04L 25/0228* (2013.01); *H04L 25/03968* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 8,718,194 B2* | 5/2014 | Doan | ................. | H04L 25/0222 375/219 |
| 2008/0279170 A1* | 11/2008 | Malladi | ................. | H04L 5/0017 370/343 |
| 2011/0142142 A1* | 6/2011 | Jwa | ................. | H04L 25/024 375/259 |
| 2011/0255483 A1* | 10/2011 | Xu | ................. | H04L 25/0232 370/329 |

(Continued)

FOREIGN PATENT DOCUMENTS

| CN | 101383793 A | 3/2009 |
|---|---|---|
| CN | 101414986 A | 4/2009 |

(Continued)

OTHER PUBLICATIONS

Qi et al., "Research and Analysis on the Pilot-aided OFDM Channel Estimation," Electronic Engineer, vol. 31, No. 8, pp. 32-35 (Aug. 2005).

(Continued)

*Primary Examiner* — Jenee Williams
(74) *Attorney, Agent, or Firm* — Leydig, Voit & Mayer, Ltd.

(57) ABSTRACT

A downlink channel estimation method and system, and a mobile terminal. In the method, a first mobile terminal is located in a central area of a cell, a second mobile terminal is located in an edge area of the cell, and a resource block of the second mobile terminal is adjacent to a resource block of the first mobile terminal, so that the first mobile terminal can use a data signal transmitted from a base station to the second mobile terminal to perform downlink channel estimation, thereby improving the accuracy of the downlink channel estimation, and enhancing the performance of the downlink channel estimation.

19 Claims, 7 Drawing Sheets

(56) References Cited

U.S. PATENT DOCUMENTS

| | | | | |
|---|---|---|---|---|
| 2012/0009980 A1* | 1/2012 | Zhang | ................... | H04L 5/0023 |
| | | | | 455/562.1 |
| 2012/0027140 A1* | 2/2012 | Weng | ................. | H04L 25/0232 |
| | | | | 375/350 |
| 2012/0275530 A1* | 11/2012 | Nazar | ................... | H04B 7/002 |
| | | | | 375/267 |

FOREIGN PATENT DOCUMENTS

| CN | 101917355 A | 12/2010 |
|---|---|---|
| CN | 102158438 A | 8/2011 |
| CN | 102404258 A | 4/2012 |
| EP | 0981207 A1 | 2/2000 |
| WO | 9959269 A1 | 11/1999 |
| WO | 2005041509 A1 | 5/2005 |

OTHER PUBLICATIONS

"3$^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, pp. 1-104, 3$^{rd}$ Generation Partnership Project, Valbonne, France (Mar. 2010).

* cited by examiner

DOWNLINK CHANNEL ESTIMATION METHOD, SYSTEM, AND MOBILE TERMINAL

CROSS-REFERENCE TO RELATED APPLICATIONS

This application is a continuation of International Patent Application No. PCT/CN2012/085445, filed on Nov. 28, 2012, which claims priority to Chinese Patent Application No. 201110387466.8, filed on Nov. 29, 2011, both of which are hereby incorporated by reference in their entireties.

TECHNICAL FIELD

The present invention relates to the field of communications technologies, and in particular, to a downlink channel estimation method, system, and a mobile terminal.

BACKGROUND

A long term evolution (LTE) network is a long term evolution project of the 3rd generation partnership project (3GPP). As a kind of communication standard to be used widely, it is required to have a higher transmission rate and a better transmission quality. To meet these requirements, accurate downlink channel estimation is an indispensable part.

In an example of the prior art, a downlink channel estimation method in an LTE network is described, and the method is summarized as follows: a base station (Node B), by using a resource element (RE) of a resource block (RB) allocated to a mobile terminal, transmits a reference signal (RS) to the mobile terminal; after receiving the signal on the RE, the mobile terminal can estimate the channel response on the RE with a common RS; after estimating the channel response on the RE, the mobile terminal can further obtain the channel responses on other REs of the RB in an interpolation method, thereby completing downlink channel estimation. Where, an RE is the smallest unit of an RB, and one RE usually contains an orthogonal frequency division multiplexing (OFDM) symbol and a sub-carrier. Specifically, in the method described in the above example of the prior art, RSs transmitted by the base station are dispersed sparsely on the RBs of the mobile terminal, and a distribution diagram of RSs is shown in FIG. 1 in which a scene that RSs are distributed on two adjacent RBs is illustrated. Where, RSs are dispersed on four REs of each RB; a grid refers to a RE, and/refers to a RB index. It is assumed that a signal received by the mobile terminal on a RE in FIG. 1 is y=hs+n; where h refers to the channel response on the RE, s refers to a RS, and n refers to an additive noise. If the statistical properties of h and n are unknown, the mobile terminal can estimate h through zero-forcing: $\hat{h}=y/s$; and if the statistical properties of h and n are known, the mobile terminal can estimate h by using a minimum mean square error (MMSE). Here, It is assumed that the mean value of h is zero, the variance of n is $v_h^2$, and the variance of n is $N_0$, therefore, the estimated value is $$\hat{h} = \frac{\sigma_h^2 \|s\|^2}{\sigma_h^2 \|s\|^2 + N_0} y;$$

where $\|s\|$ refers to an absolute value of RS. After estimating a RE channel response, the mobile terminal can obtain the channel responses on other REs by an interpolation method. In the method described in the prior art 1, errors of channel estimation mainly come from two aspects: one is an estimation error $\|h-\hat{h}\|$ of the channel responses on the RE; the other is an error caused by interpolating.

In another example of the prior art, another downlink channel estimation method in an LTE network based on the above example of the prior art is described, and the method is summarized as follows: firstly, a mobile terminal preliminarily estimates a RE channel response allocated to the mobile terminal according to the method described in the above example of the prior art; then, the mobile terminal demodulates a data signal by using the preliminarily estimated channel response, where the demodulated data signal can be a data signal on an RE with a smaller detection error probability; and finally, the mobile terminal can take the demodulated data signal as a new RS to re-estimate the RE channel response, therefore, the accuracy of channel estimation can be improved. But in an actual application, if the mobile terminal is located in the central area of a cell, a transmission power of data signals transmitted from a base station to the mobile terminal is relatively small (generally 3 dB smaller than that of common RSs), and if the mobile terminal still takes the demodulated data signal as an RS to re-estimate the RE channel response, a larger error would be introduced, thereby reducing the accuracy of downlink channel estimation.

Therefore, when the mobile terminal is located in the central area of a cell, how to improve the accuracy of downlink channel estimation is an urgent problem to be solved in this field.

SUMMARY

Embodiments of the present invention provide a downlink channel estimation method and system, a mobile terminal, which can improve the accuracy of downlink channel estimation when the mobile terminal is in the central area of a cell.

A downlink channel estimation method, including:

receiving, by a first mobile terminal located in a central area of a cell, a first signal transmitted by a base station, where the first signal is formed by a reference signal transmitted by the base station passing through a channel from the base station to the first mobile terminal;

using, by the first mobile terminal, the first signal and the reference signal to estimate a channel response estimate value ĥ from the base station to the first mobile terminal on a resource element corresponding to the first signal;

using, by the first mobile terminal, the channel response estimate value ĥ to perform interpolation on a resource block of a second mobile terminal, so as to obtain a coarse channel response estimate value h' from the base station to the first mobile terminal on a resource element corresponding to a data signal of the second mobile terminal, where the second mobile terminal is located in an edge area of the cell, and the resource block of the second mobile terminal is adjacent to a resource block of the first mobile terminal;

receiving, by the first mobile terminal, a second signal transmitted by the base station, where the second signal is formed by that the data signal of the second mobile terminal transmitted by the base station passes through the channel from the base station to the first mobile terminal on the resource element corresponding to the data signal of the second mobile terminal; and demodulating, decoding and recovering a data signal from the second signal;

taking, by the first mobile terminal, the data signal as a new reference signal, and, in combination with the second signal, updates the coarse channel response estimate value h' so as to obtain a fine channel response estimate value h" from the base station to the first mobile terminal on the resource element corresponding to the data signal of the second mobile terminal; and using, by the first mobile terminal, the channel response estimate value ĥ and the fine channel response estimate value h" to perform interpolation on the resource block of the first mobile terminal, so as to obtain a channel response estimate value from the base station to the first mobile terminal on a resource element corresponding to a data signal of the first mobile terminal.

A mobile terminal, which is located in a central area of a cell, including:

a first receiving unit, configured to, receive a first signal transmitted by a base station, where the first signal is formed by that a reference signal transmitted by the base station passes through a channel from the base station to the mobile terminal;

an estimation unit, configured to, use the first signal and the reference signal to estimate a channel response estimate value ĥ from the base station to the mobile terminal on a resource element corresponding to the first signal;

a first interpolation unit, configured to, use the channel response estimate value ĥ to perform interpolation on a resource block of a second mobile terminal, so as to obtain a coarse channel response estimate value h' from the base station to the mobile terminal on a resource element corresponding to a data signal of the second mobile terminal, where the second mobile terminal is located in an edge area of the cell, and the resource block of the second mobile terminal is adjacent to a resource block of the mobile terminal;

the first receiving unit, is also configured to, receive a second signal transmitted by the base station, where the second signal is formed by that the data signal of the second mobile terminal transmitted by the base station passes through the channel from the base station to the mobile terminal on the resource element corresponding to the data signal of the second mobile terminal;

a demodulating and decoding unit, configured to, from the second signal received by the first receiving unit, demodulate, decode and recover a data signal;

an updating unit, configured to, take the data signal as a new reference signal, and, in combination with the second signal, update the coarse channel response estimate value h' so as to obtain a fine channel response estimate value h" from the base station to the mobile terminal on the resource element corresponding to the data signal of the second mobile terminal;

a second interpolation unit, configured to, use the channel response estimate value ĥ and the estimated fine channel response estimate value h" to perform interpolation on the resource block of the mobile terminal, so as to obtain a channel response estimate value from the base station to the mobile terminal on a resource element corresponding to a data signal of the mobile terminal.

A downlink channel estimation system, including a base station and a mobile terminal located in a central area of a cell as mentioned above:

where the base station is configured to transmit a reference signal, where the reference signal, after passing through a channel from the base station to the mobile terminal, forms a first signal; and is also configured to transmit a data signal of a second mobile terminal, where the data signal of the second mobile terminal, after passing through the channel from the base station to the mobile terminal on the resource element corresponding to the data signal of the second mobile terminal, forms a second signal.

In the embodiment of the present invention, a first mobile terminal located in the central area of a cell can firstly estimate a channel response estimate value ĥ from a base station to the first mobile terminal on a resource element corresponding to a first signal, where the first signal is formed by that a reference signal transmitted by the base station passes through a channel from the base station to the first mobile terminal; then, interpolation can be performed on a resource block of a second mobile terminal by using the ĥ so as to obtain a coarse channel response estimate value h' from the base station to the first mobile terminal on a resource element corresponding to a data signal of the second mobile terminal; based on this, the first mobile terminal can receive a second signal transmitted by the base station, and, from the second signal, demodulate, decode and recover a data signal which is taken as a new reference signal, where the second signal is formed by that the data signal of the second mobile terminal transmitted by the base station passes through a channel from the base station to the first mobile terminal on a resource element corresponding to the data signal of the second mobile terminal; the first mobile terminal can use the new reference signal and the second signal to update the h' so as to obtain a fine channel response estimate value h" from the base station to the first mobile terminal on the resource element corresponding to the data signal of the second mobile terminal; and the first mobile terminal can use the ĥ and the h" to perform interpolation on a resource block of the first mobile terminal, so as to obtain a channel response estimate value from the base station to the first mobile terminal on a resource element corresponding to a data signal of the first mobile terminal, thereby achieving the downlink channel estimation for the first mobile terminal. In the scheme above, because the first mobile terminal is located in the central area of a cell, and the second mobile terminal is located in the edge area of the cell, the strength of a data signal transmitted from the base station to the second mobile terminal is much greater than the strength of a data signal transmitted from the base station to the first mobile terminal, after the first mobile terminal demodulates, decodes and recovers a data signal transmitted from the base station to the second mobile terminal from the second signal, and takes the data signal as a new reference signal to update the h', an obtained fine channel response estimate value h" from the base station to the first mobile terminal on a resource element corresponding to a data signal of the second mobile terminal will be more accurate, and when the first mobile terminal uses the ĥ and the h" to perform interpolation on the resource block of the first mobile terminal, the accuracy of downlink channel estimation can be improved, the performance of downlink channel estimation can be enhanced.

BRIEF DESCRIPTION OF DRAWINGS

In order to illustrate the technical solutions in embodiments of the present invention more clearly, accompanying drawings needed in the embodiments are illustrated briefly below. It is evident that the accompanying drawings are only some embodiments of the present invention, and persons of ordinary skill in the art can obtain other drawings according to the accompanying drawings without creative efforts.

DESCRIPTION OF EMBODIMENTS

The technical solutions in the embodiments of the present invention are clearly and completely described in the following with reference to the accompanying drawings in the embodiments of the present invention. Based on the embodiments of the present invention, all other embodiments obtained by persons of ordinary skill in the art without creative efforts shall fall within the protection scope of the present invention.

Embodiments of the present invention provide a downlink channel estimation method and system, and a mobile terminal applied to an LTE network, which are configured to improve the accuracy of downlink channel estimation and enhance the performance of downlink channel estimation when the mobile terminal is in the central area of a cell. Detailed descriptions are respectively as follows:

Embodiment 1

Figure 1:
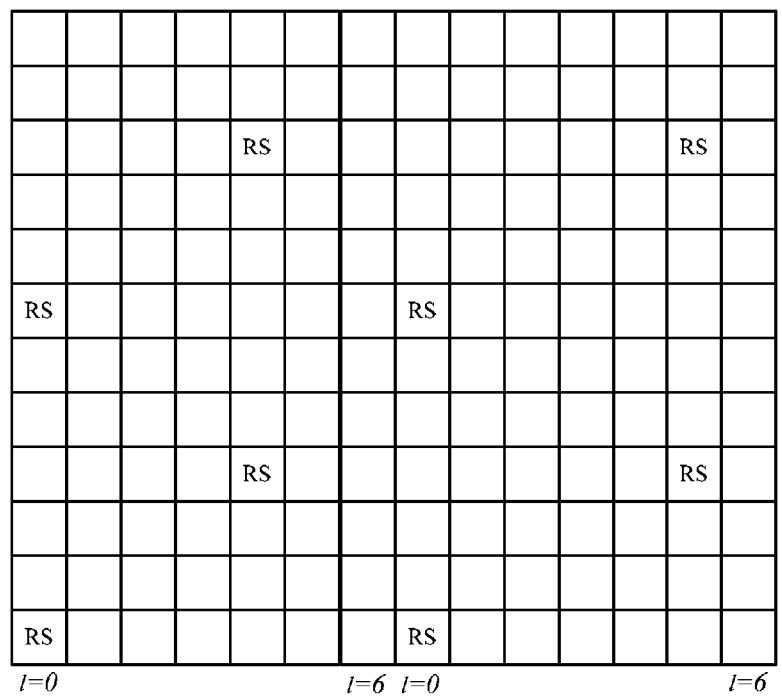
FIG. 1 is a distribution diagram of an existing RS on a RB of a mobile terminal.
Figure 2:
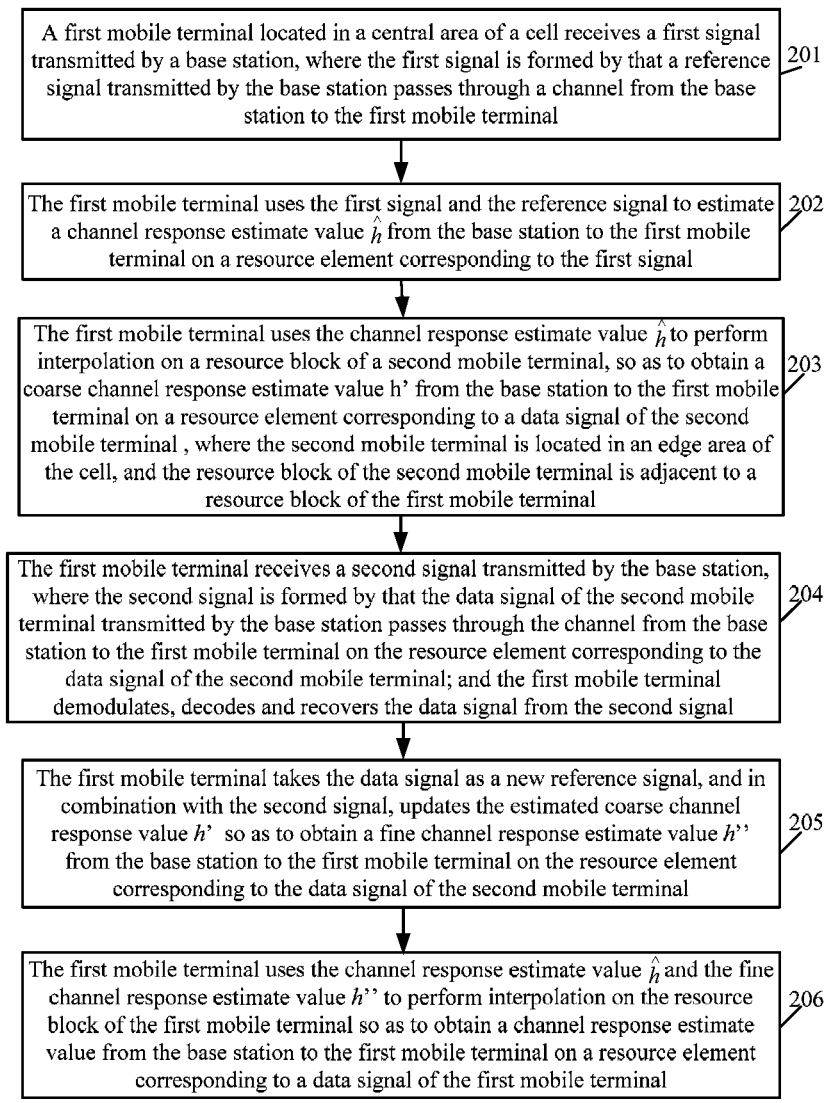
FIG. 2 is a flow chart of a downlink channel estimation method according to an embodiment of the present invention.

Please refer to FIG. 2, which is a flow chart of a downlink channel estimation method according to an embodiment of the present invention, applied to an LTE network. As shown in FIG. 2, the downlink channel estimation method can include the following steps:

201, a first mobile terminal located in the central area of a cell receives a first signal transmitted by a base station, where the first signal is formed by that a reference signal transmitted by the base station passes through a channel from the base station to the first mobile terminal;

In the embodiment of the present invention, both the central area of a cell and the subsequently mentioned edge area of the cell are relative concepts. For instance, if the coverage radius of a cell is 1,000 m, an area of which the physical distance to the center of the cell is less than 400 m can be called as the central area of the cell, and an area of which the physical distance to the center of the cell is greater than or equal to 400 m can be called as the edge area of the cell. For another instance, if the coverage radius of a cell is 500 m, an area of which the physical distance to the center of the cell is less than 250 m can be called as the central area of the cell, and an area of which the physical distance to the center of the cell is greater than or equal to 250 m can be called as the edge area of the cell. So, the division of the central area of a cell and the subsequently mentioned edge area of the cell shall refer to the size of the coverage radius of the cell, and the coverage radius of a cell is not specifically limited in the embodiments of the present invention.

In the embodiments of the present invention, the first mobile terminal can be a static or a mobile user equipment (UE) in the central area of a cell. The UE can also be called a terminal, mobile station, subscriber unit, station and the like. The UE can be a cellular phone, a personal digital assistant (PDA), a wireless modem, a wireless communication device, a handheld, a laptop computer, a cordless phone, a wireless local loop (WLL) station, and the like. UE can communicate with a macro base station, a pico base station, a femto base station, and the like.

Where, in downlink channel estimation, the reference signal transmitted by a base station is usually negotiated by the base station and the first mobile terminal, that is to say, the reference signal transmitted by the base station is already known by the first mobile terminal. Therefore, the reference signal transmitted by the base station can also be called a known reference signal or a common reference signal.

202, the first mobile terminal uses the first signal and the reference signal to estimate a channel response estimate value $\hat{h}$ from the base station to the first mobile terminal on a resource element corresponding to the first signal.

For instance, it is assumed that the first mobile terminal receives on the resource element of a resource block thereof a first signal y=hs+n transmitted by a base station; where h refers to a channel response from the base station to the first mobile terminal on the resource element (RE) corresponding to the first signal, s refers to a reference signal (RS), and n refers to an additive noise. If the statistical properties of h and n are unknown, the first mobile terminal can estimate the h through zero-forcing, so as to obtain the channel response estimate value $\hat{h}$ from the base station to the first mobile terminal on the RE corresponding to the first signal, namely, $\hat{h}=y/s$; if the statistical property of h or n is universal, the first mobile terminal can estimate the h via MMSE so as to obtain the channel response estimate value $\hat{h}$ from the base station to the first mobile terminal on the RE corresponding to the first signal. Here, it is assumed that the mean value of h is zero, the variance of h is $\sigma_h^2$, and the variance of n is $N_0$, so that the $\hat{h}$ is:

$$\hat{h} = \frac{\sigma_h^2 \|s\|^2}{\sigma_h^2 \|s\|^2 + N_0} y;$$

where $\|s\|$ refers to an absolute value of RS. Where because reference signals transmitted by the base station are usually sparsely dispersed on multiple REs of the resource block of the first mobile terminal, accordingly the first mobile terminal can estimate the channel response estimate value $\hat{h}$ from the base station to the first mobile terminal on multiple REs.

203, the first mobile terminal uses the above-mentioned channel response estimate value $\hat{h}$ to perform interpolation on a resource block of a second mobile terminal so as to obtain a coarse channel response estimate value h' from the base station to the first mobile terminal on a resource element corresponding to a data signal of the second mobile terminal, where the second mobile terminal is located in an edge area of the cell, and the resource block of the second mobile terminal is adjacent to a resource block of the first mobile terminal.

Figure 3:
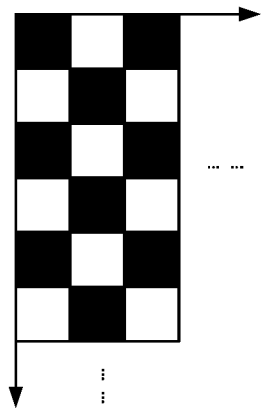
FIG. 3 is an interleaved mapping chart of resource blocks of a first mobile terminal located in the central area of a cell and a second mobile terminal located in the edge area of the cell.

Please also refer to FIG. 3, which is an interleaved mapping chart of resource blocks of a first mobile terminal located in the central area of a cell and a second mobile terminal located in the edge area of the cell. In FIG. 3, a white grid refers to the resource block of the first mobile terminal, and a black grid refers to the resource block of the second mobile terminal. From the interleaved mapping chart of resource blocks shown in FIG. 3, it can be seen clearly that, the resource block of the second mobile terminal and the resource block of the first mobile terminal in the embodiment of the present invention are adjacent to each other, and the resource element corresponding to the first signal can be a resource element of the resource block of the first mobile terminal, therefore, the first mobile terminal can use the channel response estimate value ĥ to perform interpolation on the resource block of the second mobile terminal, so as to obtain the coarse channel response estimate value h' from the base station to the first mobile terminal on the resource element corresponding to the data signal of the second mobile terminal.

In the embodiment of the present invention, when the base station performs downlink resource scheduling, an adjacent resource block of the resource block of the first mobile terminal located in the central area of a cell can be scheduled to the second mobile terminal located in the edge area of the cell according to the interleaved mapping chart of resource blocks shown in FIG. 3. Since the specific implementation procedure of downlink resource scheduling implemented by the base station is widely known by technicians in this field, it will not be repeated here.

For example, the first mobile terminal can use the channel response estimate value ĥ to perform any one of interpolation such as linear interpolation, polynomial interpolation, spline interpolation, triangular interpolation, rational interpolation and wavelet interpolation on the resource block of the second mobile terminal, so as to obtain the coarse channel response estimate value h' from the base station to the first mobile terminal on the resource element corresponding to the data signal of the second mobile terminal.

Figure 4:
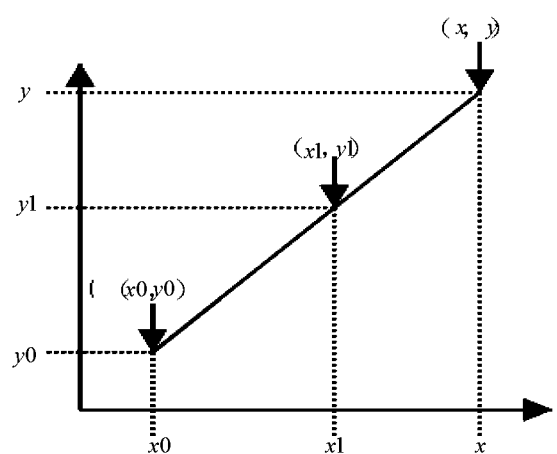
FIG. 4 is a linear relation chart according to an embodiment of the present invention.

By taking the linear interpolation as an example, as shown in FIG. 4, if the first mobile terminal has estimated that the values of x0, x1 in a resource block thereof are respectively y0 and y1, where, x0 and x1 can refer to resource block indexers, and y0 and y1 can refer to the channel response estimate values ĥ of two resource elements estimated by the first mobile terminal, and then the following linear relation can be determined according to the (x0, y0) and (x1, y1), namely:

$$y = y0 + (x - x0)\frac{y1 - y0}{x1 - x0}$$

Based on the above linear relation, the resource block indexer x of the second mobile terminal can be substituted into the linear relation, so that y can be estimated, and y can be taken as a coarse channel response estimate value h' from the base station to the first mobile terminal on the resource element corresponding to the data signal of the second mobile terminal based on the linear relation, thereby achieving the purpose of using the channel response estimate value ĥ to perform interpolation on the resource block of the second mobile terminal so as to obtain the coarse channel response estimate value h' from the base station to the first mobile terminal on the resource element corresponding to the data signal of the second mobile terminal 204, the first mobile terminal receives a second signal transmitted by the base station, where the second signal is formed by that the data signal of the second mobile terminal transmitted by the base station passes through the channel from the base station to the first mobile terminal on the resource element corresponding to the data signal of the second mobile terminal, and, from the second signal, demodulates, decodes and recovers the data signal.

Because the first mobile terminal is located in the central area of the cell, and the second mobile terminal is located in the edge area of the cell, the strength of a data signal transmitted from the base station to the second mobile terminal is much greater than the strength of a data signal transmitted from the base station to the first mobile terminal. Practices show that the data signal transmitted from the base station to the second mobile terminal is at least 10 dB stronger than the data signal transmitted from the base station to the first mobile terminal.

205, the first mobile terminal takes the data signal as a new reference signal, and, in combination with the second signal, updates the coarse channel response estimate value h' so as to obtain a fine channel response estimate value h" from the base station to the first mobile terminal on the resource element corresponding to the data signal of the second mobile terminal.

Where, the procedure that the first mobile terminal takes the data signal as a new reference signal, and, in combination with the second signal, estimates to obtain a fine channel response estimate value h" from the base station to the first mobile terminal on the resource element corresponding to the data signal of the second mobile terminal is similar to the step 202, which will not be repeated here.

In the downlink direction of an LTE network, the strength of a data signal received by the first mobile terminal located in the central area of the cell, which is transmitted from the base station to the second mobile terminal located in the edge area of the cell, is far greater than the strength of a data signal transmitted from the base station to the first mobile terminal. Because the second mobile terminal located in the edge area of the cell is far away from the base station, for ensuring that the strength of a downlink data signal received by the second mobile terminal is enough for normal demodulating and decoding, the path loss compensation applied by the base station to the data signal transmitted to the second mobile terminal is usually greater than the path loss compensation to the data signal transmitted to the first mobile terminal. Assuming that the cell is a macro cell with a coverage radius of 500 m, the distance from the first mobile terminal located in the central area of the cell to the base station is 80 m, and the distance from the second mobile terminal located in the edge area of the cell to the base station is 200 m, a path loss compensation difference of 15 dB between the first mobile terminal and the second mobile terminal can be calculated with reference to a path loss model 128.1+37.6 log 10(R) in the standard TR36.814 of the Third Generation Partnership Project (3GPP), and then the transmitting power of the base station to the second mobile terminal is at least 10 dB greater than the transmitting power of the base station to the first mobile terminal, where, the unit of R is km, and R refers to the distance between the base station and the mobile terminal. Because the strength of a data signal transmitted from the base station to the second mobile terminal is much greater than the strength of a data signal transmitted from the base station to the first mobile terminal, after the first mobile terminal demodulates a data signal transmitted from the base station to the second mobile terminal from the second signal and updates the coarse channel response estimate value h' by taking the data signal as a new reference signal, an obtained fine channel response estimate value h" from the base station to the first mobile terminal on the resource element corresponding to the data signal of the second mobile terminal will be more accurate. 206, the first mobile terminal uses the channel response estimate value ĥ and the fine channel response estimate value h" to perform interpolation on the resource block of the first mobile terminal so as to obtain a channel response estimate value from the base station to the first mobile terminal on a resource element corresponding to a first data signal of the mobile terminal.

For example, the first mobile terminal can use the channel response estimate value ĥ and the fine channel response estimate value h" to perform any one of interpolation such as linear interpolation, polynomial interpolation, spline interpolation, triangular interpolation, rational interpolation and wavelet interpolation on the resource block of the first mobile terminal, so as to obtain a channel response estimate value from the base station to the first mobile terminal on a resource element corresponding to a data signal of the first mobile terminal, thereby realizing downlink channel estimation.

In the embodiment of the present invention, the premise of that the first mobile terminal can demodulate a data signal from the second signal in the step 204 is hat the first mobile terminal can get a modulation and encoding information (Modulation and coding scheme, MCS) of the second mobile terminal in advance. Hereinafter, how the first mobile terminal can get the MCS of the second mobile terminal in advance are introduced in detail respectively through two different schemes.

Scheme 1: adding a first control message from a base station to a first mobile terminal, where the first control message is used for indicating the MCS of the second mobile terminal.

The specific implementation procedure of the scheme 1 is as follows:

1. The first mobile terminal receives a first control message sent by a base station, where, the first control message carries the MCS of the second mobile terminal.

2. The first mobile terminal analyzes the first control message so as to obtain the MCS of the second mobile terminal.

Accordingly, the first mobile terminal can use the MCS of the second mobile terminal and, from the second signal, demodulate and decode data corresponding to the data signal, and recover the data signal transmitted from the base station to the second mobile terminal according to the data.

As an alternative implementation mode, the first control message sent by the base station in the scheme 1 can also carry cyclic redundancy check (Cyclic Redundancy Check, CRC) information of the second mobile terminal. Accordingly, the first mobile terminal can analyze the first control message sent by the base station and obtain the CRC information of the second mobile terminal; then, the first mobile terminal can use the CRC information to perform CRC check on the demodulated, decoded and recovered data signal, if the check is correct, the first mobile terminal executes the steps 205 and 206; otherwise, if the check is wrong, the first mobile terminal uses the channel response estimate value ĥ estimated in the step 202 to perform the interpolation on the resource block of the first mobile terminal so as to obtain the channel response estimate value from the base station to the first mobile terminal on the resource element corresponding to the data signal of the first mobile terminal, thereby realizing downlink channel estimation.

In the embodiment of the present invention, the first mobile terminal performs CRC check on the demodulated, decoded and recovered data signal firstly, then if the check is correct, the data signal is taken as the new reference signal, therefore, the accuracy of the new reference signal can be greatly improved, so that, after the steps 205 and 206 are executed by the first mobile terminal, the accuracy of downlink channel estimation of the first mobile terminal can be improved effectively, and the performance of downlink channel estimation can be enhanced.

Scheme 2: adding a second control message from the base station to the first mobile terminal, where the purpose of the second control message is to inform the first mobile terminal of scrambling code information of the second mobile terminal, so that the first mobile terminal gets the MCS of the second mobile terminal.

The specific implementation procedure of scheme 2 is as follows:

1. the first mobile terminal receives a second control message sent by the base station, where the second control message carries scrambling code information of the second mobile terminal.

2. the first mobile terminal uses the scrambling code information to descramble a physical downlink control signal of the second mobile terminal so as to obtain the MCS of the second mobile terminal.

Accordingly, the first mobile terminal can use the MCS of the second mobile terminal to, from the second signal the data, demodulate and decode data corresponding to the data signal, and recover the data signal transmitted from the base station to the second mobile terminal according to the data.

As an alternative implementation mode, in the scheme 2, the first mobile terminal can further obtain the CRC information of the second mobile terminal through using the scrambling code information to descramble the physical downlink control signal of the second mobile terminal. Accordingly, the first mobile terminal can use the CRC information to perform CRC check on the demodulated, decoded and recovered data signal, then if the check is correct, the steps 205 and 206 are executed; otherwise, if the check is wrong, the first mobile terminal uses the channel response estimate value ĥ estimated in the step 202 to perform interpolation on the resource block of the first mobile terminal so as to obtain the channel response estimate value from the base station to the first mobile terminal on the resource element corresponding to the data signal of the first mobile terminal, thereby realizing downlink channel estimation.

As an alternative implementation mode, the first mobile terminal can also identify the mode of a signal transmitted from the base station to the second mobile terminal so as to speculate the modulation and encoding information of the data signal of the second mobile terminal; which is not limited in the embodiment of the present invention.

As an alternative implementation mode, the detection error probability of the first mobile terminal on the resource element corresponding to the data signal of the second mobile terminal is less than or equal to a preset threshold value. That is to say, the data signals demodulated, decoded and recovered by the first mobile terminal are selected from resource elements with a detection error probability less than or equal to the preset threshold value in the resource block of the second mobile terminal. In an actual application, the first mobile terminal can assess the detection error probability of the resource element by a signal logarithmic likelihood ratio on the resource element of the resource block of the second mobile terminal. Where, the first mobile terminal takes a data signal demodulated, decoded and recovered from a resource element with a detection error probability less than or equal to the preset threshold value in the resource block of the second mobile terminal as the new reference signal to update the coarse channel response estimate value h', which can improve the accuracy of the obtained fine channel response estimate value h" from the base station to the first mobile terminal on resource element corresponding to the data signal of the second mobile terminal, and then, can improve the accuracy of downlink channel estimation when the ĥ and h" are used to perform the interpolation on the resource block of the first mobile terminal subsequently.

In the embodiment 1 of the present invention, a first mobile terminal located in the central area of a cell can estimate a channel response estimate value ĥ from the base station to the first mobile terminal on a resource element corresponding to a first signal firstly, where, the first signal is formed by that a reference signal transmitted by the base station passes through a channel from the base station to the first mobile terminal; and then, the ĥ can be used to perform interpolation on a resource block of a second mobile terminal so as to obtain a coarse channel response estimate value h' from the base station to the first mobile terminal on a resource element corresponding to a data signal of the second mobile terminal; on this basis, the first mobile terminal can receive a second signal transmitted by the base station, and, from the second signal, demodulate, decode and recover a data signal as a new reference signal, where, the second signal is formed by that the data signal of the second mobile terminal transmitted by the base station passes through the channel from the base station to the first mobile terminal on the resource element corresponding to the data signal of the second mobile terminal; the first mobile terminal can use the new reference signal and the second signal to update the h' so as to obtain a fine channel response estimate value h" from the base station to the first mobile terminal on the resource element corresponding to the data signal of the second mobile terminal; and the first mobile terminal can use the ĥ and h" to perform interpolation on the resource block of the first mobile terminal so as to obtain the channel response estimate value from the base station to the first mobile terminal on a resource element corresponding to a data signal of the first mobile terminal, thereby realizing downlink channel estimation of the first mobile terminal. In the scheme above, since the first mobile terminal is located in the central area of a cell and the second mobile terminal is located in the edge area of the cell, the strength of a data signal transmitted from the base station to the second mobile terminal is much greater than the strength of a data signal transmitted from the base station to the first mobile terminal, the first mobile terminal demodulates, decodes and recovers the data signal transmitted from the base station to the second mobile terminal from the second signal, and after the data signal is taken as a new reference signal to update the h', the obtained fine channel response estimate value h" from the base station to the first mobile terminal on the resource element corresponding to the data signal of the second mobile terminal will be more accurate; and then when the first mobile terminal uses the ĥ and the h" to perform interpolation on the resource block of the first mobile terminal, the accuracy of downlink channel estimation can be improved, and the performance of downlink channel estimation can be enhanced.

Embodiment 2

Figure 5:
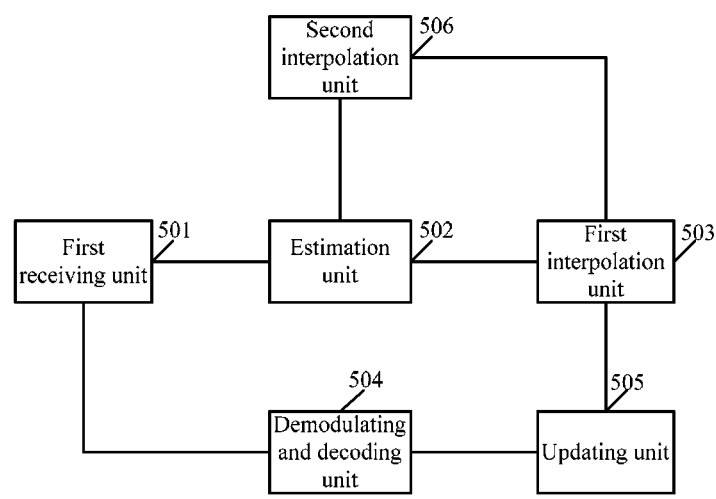
FIG. 5 is a structural diagram of a mobile terminal according to an embodiment of the present invention.

Please refer to FIG. 5, which is a structural diagram of a mobile terminal according to an embodiment of the present invention, and can be applied to an LTE network. The mobile terminal according to the embodiment of the present invention is located in a central area of a cell. As shown in FIG. 5, the mobile terminal can include the following units:

a first receiving unit 501, configured to, receive a first signal transmitted by a base station, where the first signal is formed by that a reference signal transmitted by the base station passes through a channel from the base station to the mobile terminal;

an estimation unit 502, configured to, use the first signal and the reference signal to estimate a channel response estimate value ĥ from the base station to the mobile terminal on a resource element corresponding to the first signal;

a first interpolation unit 503, configured to, use the channel response estimate value ĥ to perform interpolation on a resource block of a second mobile terminal, so as to obtain a coarse channel response estimate value h' from the base station to the mobile terminal on a resource element corresponding to a data signal of the second mobile terminal, where the second mobile terminal is located in an edge area of the cell, and the resource block of the second mobile terminal is adjacent to a resource block of the mobile terminal;

Where, the first receiving unit 501 is also configured to, receive a second signal transmitted by the base station, where the second signal is formed by that the data signal of the second mobile terminal transmitted by the base station passes through the channel from the base station to the mobile terminal on the resource element corresponding to the data signal of the second mobile terminal.

a demodulating and decoding unit 504, configured to, demodulate, decode and recover the data signal from the second signal received by the first receiving unit 501;

an updating unit 505, configured to, take the data signal demodulated by the demodulating and decoding unit 504 as a new reference signal, and in combination with the second signal update the coarse channel response estimate value h', so as to obtain a fine channel response estimate value h" from the base station to the mobile terminal on the resource element corresponding to the data signal of the second mobile terminal; and a second interpolation unit 506, configured to, use the channel response estimate value ĥ and the fine channel response estimate value h" to perform interpolation on the resource block of the mobile terminal, so as to obtain a channel response estimate value from the base station to the mobile terminal on a resource element corresponding to a data signal of the mobile terminal.

Figure 6:
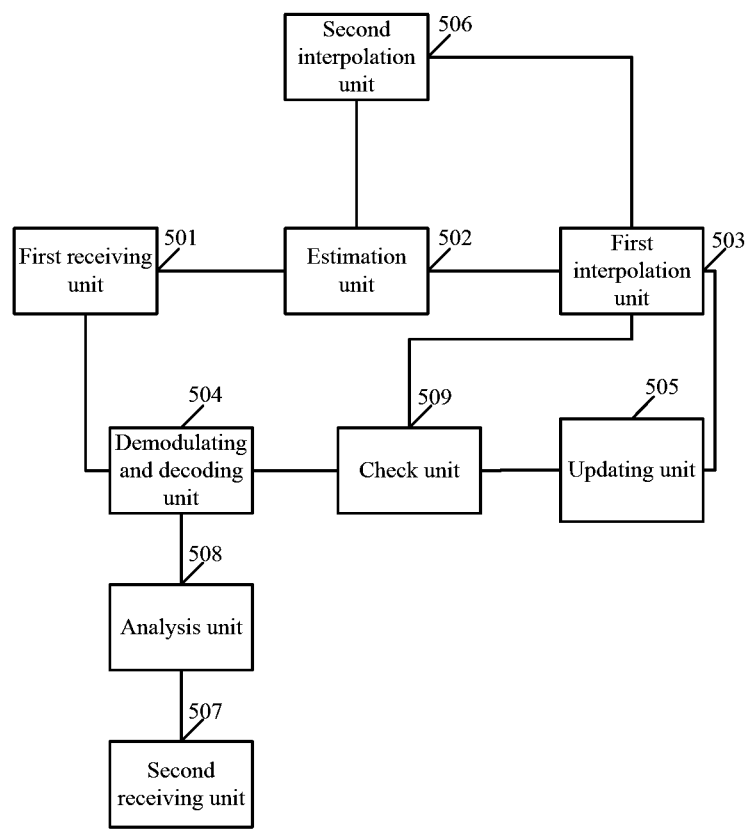
FIG. 6 is a structural diagram of another mobile terminal according to an embodiment of the present invention.

Please refer to FIG. 6 together, which is a structural diagram of another mobile terminal according to an embodiment of the present invention. Where, the mobile terminal shown in FIG. 6 is obtained by optimizing the mobile terminal located in the central area of the cell as shown in FIG. 5. Compared with the mobile terminal shown in FIG. 5, the mobile terminal shown in FIG. 6 also includes the following units:

a second receiving unit 507, configured to, receive a first control message sent by a base station, where the first control message carries modulation and encoding information of the second mobile terminal.

an analysis unit 508, configured to, analyze the first control message so as to obtain the modulation and encoding information of the second mobile terminal, and output to the demodulating and decoding unit 504.

Accordingly, the demodulating and decoding unit 504 is specifically configured to, use the modulation and encoding information to, from the second signal received by the first receiving unit 501, demodulate and decode the data corresponding to the data signal, and, according to the data, recover the data signal transmitted from the base station to the second mobile terminal.

As an alternative implementation mode, if the first control message also carries CRC information of the second mobile terminal, the mobile terminal shown in FIG. 6 can further includes:

a check unit 509, configured to, use the CRC information to perform CRC check on the data signal demodulated, decoded and recovered by the demodulating and decoding unit 504, if the check is correct, inform the updating unit 505 to take the data signal as the new reference signal, and, in combination with the second signal, update the coarse channel response estimate value h' so as to obtain the fine channel response estimate value h" from the base station to the mobile terminal on the resource element corresponding to the data signal of the second mobile terminal; if the check is wrong, inform the first interpolation unit 503 to use the channel response estimate value ĥ to perform the interpolation on the resource block of the mobile terminal by so as to obtain the channel response estimate value from the base station to the mobile terminal on the resource element corresponding to the data signal of the mobile terminal.

Accordingly, the updating unit 505 is also configured to take the data signal as the new reference signal according to a notification from the check unit 609, and, in combination with the second signal, update the coarse channel response estimate value h', so as to obtain the fine channel response estimate value h" from the base station to the mobile terminal on the resource element corresponding to the data signal of the second mobile terminal.

Accordingly, the first interpolation unit 503 is also configured to, according to the notification of the check unit 609, use the channel response estimate value ĥ to perform interpolation on the resource block of the mobile terminal, so as to obtain the channel response estimate value from the base station to the mobile terminal on the resource element corresponding to the data signal of the mobile terminal, thereby realizing downlink channel estimation.

Accordingly, the analysis unit 508 is also configured to analyze, from the first control message, the CRC information of the second mobile terminal and output to the check unit 509.

Figure 7:
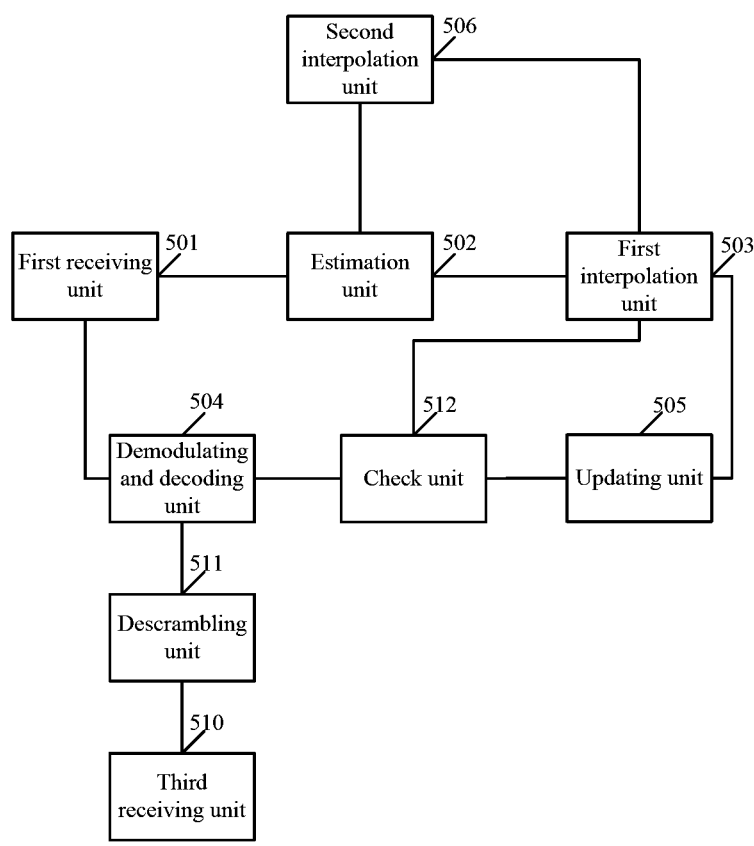
FIG. 7 is a structural diagram of still another mobile terminal according to an embodiment of the present invention.

Please refer to FIG. 7 together, which is a structural diagram of still another mobile terminal according to an embodiment of the present invention. Where, the mobile terminal shown in FIG. 7 is obtained by optimizing the mobile terminal located in the central area of the cell as shown in FIG. 5. Compared with the mobile terminal shown in FIG. 5, the mobile terminal shown in FIG. 7 also includes the following units:

a third receiving unit 510, configured to, receive a second control message sent by the base station, where the second control message carries scrambling code information of the second mobile terminal; and a descrambling unit 511, configured to, use the scrambling code information to descramble a physical downlink control signal of the second mobile terminal, so as to obtain modulation and encoding information of the second mobile terminal and output to the demodulating and decoding unit 508.

Accordingly, the demodulating and decoding unit 508 is specifically configured to use the modulation and encoding information to demodulate and decode the data corresponding to the data signal from the second signal received by the first receiving unit 501, and recover the data signal transmitted from the base station to the second mobile terminal according to the data.

As an alternative implementation mode, if the descrambling unit 511 further obtains CRC information of the second mobile terminal when using the scrambling code information to descramble the physical downlink control signal of the second mobile terminal, the mobile terminal shown in FIG. 7 can further include:

a check unit 512, configured to, use the CRC information to perform CRC check on the data signal demodulated, decoded and recovered by the demodulating and decoding unit 508, if the check is correct, inform the updating unit 505 to take the data signal as the new reference signal and, in combination with the second signal, update the coarse channel response estimate value h', so as to obtain the fine channel response estimate value h" from the base station to the mobile terminal on the resource element corresponding to the data signal of the second mobile terminal; if the check is wrong, inform the first interpolation unit 503 to use the channel response estimate value ĥ to perform interpolation on the resource block of the mobile terminal, so as to obtain the channel response estimate value from the base station to the mobile terminal on the resource element corresponding to the data signal of the mobile terminal.

Accordingly, the updating unit 505 is also configured to take the data signal as the new reference signal according to a notification from the check unit 512, and, in combination with the second signal, update the coarse channel response estimate value h', so as to obtain the fine channel response estimate value h" from the base station to the mobile terminal on the resource element corresponding to the data signal of the second mobile terminal.

Accordingly, the first interpolation unit 503 is also configured to, according to the notification of the check unit 512, use the channel response estimate value ĥ to perform interpolation on the resource block of the mobile terminal, so as to obtain the channel response estimate value from the base station to the mobile terminal on the resource element corresponding to the data signal of the mobile terminal, thereby realizing downlink channel estimation.

In the embodiment of the present invention, the interpolation modes include any one of linear interpolation, polynomial interpolation, spline interpolation, triangular interpolation, rational interpolation and wavelet interpolation.

As an alternative implementation mode, the detection error probability of the mobile terminal on the resource element corresponding to the data signal of the second mobile terminal is less than or equal to a preset threshold value. That is to say, the data signals demodulated, decoded and recovered by the demodulating and decoding unit 504 are those selected from resource elements with a detection error probability less than or equal to the preset threshold value in the resource block of the second mobile terminal. In an actual application, the mobile terminal can assess the detection error probability on the resource element by a signal logarithmic likelihood ratio on the resource element of the resource block of the second mobile terminal. Where, the demodulating and decoding unit 504 takes the data signal, which is demodulated, decoded and recovered from the resource element with a detection error probability less than or equal to the preset threshold value in the resource block of the second mobile terminal, as the new reference signal to update the coarse channel response estimate value h', which can improve the accuracy of the obtained fine channel response estimate value h" from the base station to the mobile terminal on the resource element corresponding to the data signal of the second mobile terminal, and then, can improve the accuracy of downlink channel estimation in the process of using the ĥ and h" to perform the interpolation on the resource block of the first mobile terminal subsequently.

In the embodiment 2 of the present invention, since the mobile terminal provided by the embodiment of the present invention is located in the central area of a cell, and the second mobile terminal is located in the edge area of the cell, the strength of a data signal transmitted from the base station to the second mobile terminal is much greater than the strength of a data signal transmitted from the base station to the mobile terminal provided by the embodiment of the present invention; after the mobile terminal provided by the embodiment of the present invention demodulates, decodes and recovers the data signal transmitted from the base station to the second mobile terminal from the second signal, and takes such data signal as a new reference signal to update the coarse channel response estimate value h', an obtained fine channel response estimate value h" from the base station to the first mobile terminal on the resource element corresponding to the data signal of the second mobile terminal will be more accurate, and then when the mobile terminal provided by the embodiment of the present invention uses the ĥ and the h" to perform interpolation on the resource block thereof, the accuracy of downlink channel estimation can be improved, the performance of downlink channel estimation can be enhanced Embodiment 3

Figure 8:
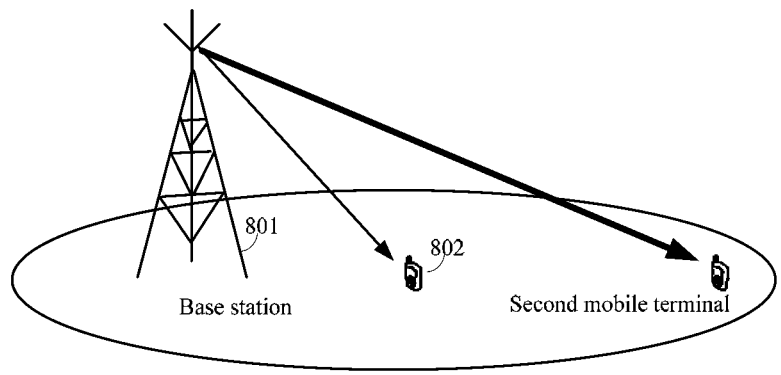
FIG. 8 is a structural diagram of a downlink channel estimation system according to an embodiment of the present invention.

Please refer to FIG. 8, which is a structural diagram of a downlink channel estimation system according to an embodiment of the present invention. As shown in FIG. 8, the downlink channel estimation system can include a base station 801 and a mobile terminal 802 located in the central area of a cell.

Where, the structure and function of the mobile terminal 802 located in the central area of the cell can be respectively same as the structure and function of the mobile terminals shown in FIG. 5 to FIG. 7, which will not be repeated here.

Where, the base station 801 is configured to transmit a reference signal, where the reference signal, after passing through a channel from the base station 801 to the mobile terminal 802, forms a first signal; and transmit a data signal of the second mobile terminal, where the data signal of the second mobile terminal, after passing through a channel from the base station 801 to the mobile terminal 802 on the resource element corresponding to the data signal of the second mobile terminal, forms a second signal.

As an alternative implementation mode, the base station 801 is also configured to send a first control message to the mobile terminal 802, where the first control message carries modulation and encoding information of the second mobile terminal.

As an alternative implementation mode, the first control message can also carry CRC information of the second mobile terminal.

As an alternative implementation mode, the base station 801 is also configured to send a second control message to the mobile terminal 802, where the second control message carries scrambling code information of the second mobile terminal.

As an alternative implementation mode, the second control message also carries the CRC information of the second mobile terminal.

In the Embodiment 3 of the present invention, the mobile terminal 802 located in the central area of a cell can firstly estimate a channel response estimate value ĥ from the base station 801 to the mobile terminal 802 on the resource element corresponding to the first signal, Where, the first signal is formed by that the reference signal transmitted by the base station 801 passes through a channel from the base station 801 to the mobile terminal 802; then, the ĥ can be used to perform interpolation on the a resource block of a second mobile terminal so as to obtain a coarse channel response estimate value h' from the base station to the first mobile terminal on a resource element corresponding to a data signal of the second mobile terminal; on this basis, the mobile terminal 802 can receive the second signal, demodulate, decode and recover the data signal from the second signal, and take the data signal as a new reference signal, where, the second signal is formed by that the data signal of the second mobile terminal transmitted by the base station 801 passes through the channel from the base station 801 to the mobile terminal 802 on the resource element corresponding to the data signal of the second mobile terminal; the mobile terminal 802 can use the new reference signal and the second signal to update the h', so as to obtain a fine channel response estimate value h" from the base station 801 to the mobile terminal 802 on the resource element corresponding to the data signal of the second mobile terminal; the mobile terminal 802 can use the ĥ and h" to perform interpolation on the resource block of the mobile terminal 802, so as to obtain a channel response estimate value from the base station 801 to the mobile terminal 802 on the resource element corresponding to the data signal of the mobile terminal 802, thereby realizing the downlink channel estimation on the mobile terminal 802. In the scheme above, since the mobile terminal 802 is located in the central area of a cell and the second mobile terminal is located in the edge area of the cell, the strength of a data signal transmitted from the base station 801 to the second mobile terminal is much greater than the strength of a data signal transmitted from the base station 801 to the mobile terminal 802; after the mobile terminal 802 demodulates, decodes and recovers the data signal transmitted from the base station 801 to the second mobile terminal from the second signal, and takes the data signal as a new reference signal to update the h', an obtained fine channel response estimate value h" from the base station 801 to the mobile terminal 802 on the resource element corresponding to the data signal of the second mobile terminal will be more accurate; and then when the mobile terminal 802 uses the ĥ and h" to perform interpolation on the resource block of the mobile terminal 802, the accuracy of downlink channel estimation can be improved, and the performance of downlink channel estimation can be enhanced.

The downlink channel estimation method and system, and mobile terminal provided by the embodiment of the present invention are respectively described in detail above. For understanding the advantages of the present invention on realizing the downlink channel estimation more clearly, the performance of realizing downlink channel estimation by the present invention will be further simulated as follows, and a simulation result of the present invention is compared with the performance of an existing downlink channel estimation method.

Figure 9:
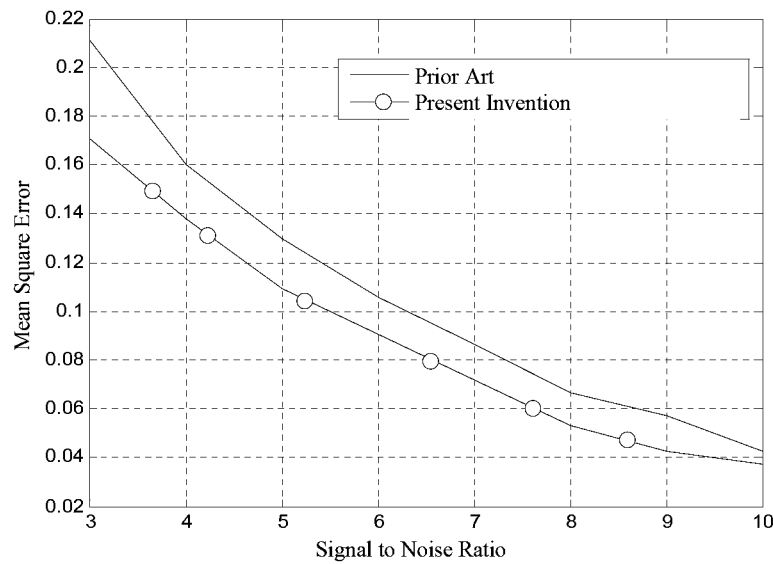
FIG. 9 is a simulation performance comparison chart of a downlink channel estimation method provided by the present invention and an existing downlink channel estimation method on mean square errors.

Please refer to FIG. 9, which is a simulation performance comparison chart of a downlink channel estimation method provided by the present invention and an existing downlink channel estimation method on mean square errors. Where, a curve with circles represents a performance chart for realizing downlink channel estimation by the present invention, and a curve without circles represents a performance chart of existing downlink channel estimation. Where, the vertical coordinate represents a mean square error (the unit can be dB); the horizontal coordinate represents a signal-to-noise ratio (SNR) of RS of a UE located in the edge area of a cell received by a UE located in the central area of the cell, and generally, the unit for SNR is dB. Where, according to the present invention, the performance simulation on the downlink channel estimation can be realized according to simulation parameters shown in a Table 1 below.

TABLE 1

Hypothesis of Simulation Parameters

| | |
|---|---|
| Channel model (Channel model) | 3GPP TUx |
| Bandwidth (Bandwidth) | 10 MHz |
| Sampling frequency (Sampling frequency) | 15.36 MHz |
| OFDM symbol period (OFDM symbol period) | 66.7us |
| Cyclic Prefix (Cyclic Prefix) | Not included (Not included) |
| UE velocity (UE velocity) | 3 km/h |
| RB | 12 (subcarrier) * 7 (OFDM symbol) |
| RS | 4 RE/RB, uniformly distributed |
| Interpolation method (Interpolation method) | Linear (linear) |
| Modulation scheme of RS (Modulation scheme of RS) | Quadrature Phase Shift Keying (QPSK) |
| Modulation scheme of cell-edge UE (Modulation scheme of cell-edge UE) | Quadrature Phase Shift Keying (QPSK) |
| difference between a SNR of a RS and a SNR of a data signal of cell-edge UE (SNR_RS-SNR_cell_edge_data) | 3 dB |

Through FIG. 9, it can be seen that the performance of realizing downlink channel estimation by the present invention is much better than the performance of existing downlink channel estimation. For example, when the horizontal coordinate SNR=5 dB, the mean square error of downlink channel estimation realized by the present invention is less than 0.12 dB, but the mean square error of existing downlink channel estimation is much bigger than 0.12 dB, therefore, the performance of downlink channel estimation can be improved by adopting the present invention.

By the embodiments described above, those ordinary persons skilled in the art may clearly understand that all or some of the steps in various methods of the above embodiments can be implemented by instructing relative hardware by using a program. This program can be stored in a computer-readable storage medium, and the storage medium can include a flash memory, a read-only memory (Read-Only Memory, ROM), a random access memory (Random Access Memory, RAM), a magnetic disk or an optical disk.

The downlink channel estimation method and system, and the mobile terminal according to the embodiment of the present invention are described in detail above, and the principles and implementation modes of the present invention are illustrated through specific cases. However, the description of the above embodiments aims only to help understanding the methods and its core concept of the present invention; in the meantime, for the persons of ordinary skill in the art, there would be changes in the specific implementation modes and application scopes without departing the concept of the present invention. In conclusion, the contents of this invention should not be interpreted as a restriction on the present invention.

What is claimed is:

1. A downlink channel estimation method, comprising:
receiving, by a first mobile terminal located in a central area of a cell, a first signal transmitted by a base station, wherein the first signal is formed by a reference signal transmitted by the base station passing through a channel from the base station to the first mobile terminal;
estimating, by the first mobile terminal, a channel response estimate value $\hat{h}$ from the base station to the first mobile terminal on a resource element corresponding to the first signal, using the first signal and the reference signal;
performing, by the first mobile terminal, interpolation on a resource block of a second mobile terminal using the channel response estimate value $\hat{h}$, so as to obtain a coarse channel response estimate value h' from the base station to the first mobile terminal on a resource element corresponding to a data signal of the second mobile terminal, wherein the second mobile terminal is located in an edge area of the cell, and the resource block of the second mobile terminal is adjacent to a resource block of the first mobile terminal;
receiving, by the first mobile terminal, a second signal transmitted by the base station, wherein the second signal is formed by the data signal of the second mobile terminal transmitted by the base station passing through the channel from the base station to the first mobile terminal on the resource element corresponding to the data signal of the second mobile terminal; and demodulating, decoding and recovering the data signal of the second mobile terminal from the second signal;
setting, by the first mobile terminal, the recovered data signal of the second mobile terminal as a new reference signal, and, in combination with the second signal, updating the coarse channel response estimate value h', so as to obtain a fine channel response estimate value h" from the base station to the first mobile terminal on the resource element corresponding to the data signal of the second mobile terminal; and
using, by the first mobile terminal, the channel response estimate value $\hat{h}$ and the fine channel response estimate value h" to perform the interpolation on the resource block of the first mobile terminal, so as to obtain a channel response estimate value from the base station to the first mobile terminal on a resource element corresponding to a data signal of the first mobile terminal.

2. The method according to claim 1, wherein the method further comprises:
receiving, by the first mobile terminal, a first control message sent by the base station, wherein the first control message carries modulation and encoding information of the second mobile terminal;
analyzing, by the first mobile terminal, the first control message, so as to obtain the modulation and encoding information of the second mobile terminal; and
wherein the demodulating, decoding and recovering the data signal of the second mobile terminal from the second signal by the first mobile terminal, comprises:
demodulating and decoding, by the first mobile terminal, data corresponding to the data signal of the second mobile terminal, from the second signal, using the modulation and encoding information; and, according to the demodulated and decoded data, recovering the data signal of the second mobile terminal which has been transmitted from the base station to the second mobile terminal.

3. The method according to claim 2, wherein if the first control message also carries cyclic redundancy check information of the second mobile terminal, the method further comprises:
analyzing, by the first mobile terminal, the first control message to obtain the cyclic redundancy check information of the second mobile terminal; and
performing, by the first mobile terminal, cyclic redundancy check on the demodulated, decoded and recovered data signal using the cyclic redundancy check information;
if the cyclic redundancy check is correct, executing a procedure of taking the data signal of the second mobile terminal as the new reference signal and in combination with the second signal updating the coarse channel response estimate value h', so as to obtain the fine channel response estimate value h" from the base station to the first mobile terminal on the resource element corresponding to the data signal of the second mobile terminal;

if the cyclic redundancy check is incorrect, performing the interpolation on the resource block of the first mobile terminal using the channel response estimate value $\hat{h}$ to, so as to obtain the channel response estimate value from the base station to the first mobile terminal on the resource element corresponding to the data signal of the first mobile terminal.

4. The method according to claim 1, wherein the method further comprises:

receiving, by the first mobile terminal, a second control message sent by the base station, wherein the second control message carries scrambling code information of the second mobile terminal;

using, by the first mobile terminal, the scrambling code information to descramble a physical downlink control signal of the second mobile terminal, so as to obtain modulation and encoding information of the second mobile terminal;

the demodulating, decoding and recovering the data signal of the second mobile terminal from the second signal by the first mobile terminal, comprises:

demodulating and decoding, by the first mobile terminal, data corresponding to the data signal of the second mobile terminal, from the second signal, using the modulation and encoding information; and, according to the demodulated and decoded data, recovering the data signal of the second mobile terminal which has been transmitted from the base station to the second mobile terminal.

5. The method according to claim 4, wherein if cyclic redundancy check information of the second mobile terminal is also obtained when the first mobile terminal uses the scrambling code information to descramble the physical downlink control signal of the second mobile terminal, the method further comprises:

performing, by the first mobile terminal, cyclic redundancy check on the demodulated, decoded and recovered data signal of the second mobile terminal using the cyclic redundancy check information;

if the cyclic redundancy check is correct, executing a procedure of taking the data signal of the second mobile terminal as the new reference signal, and, in combination with the second signal, updating the coarse channel response estimate value h', so as to obtain the fine channel response estimate value h" from the base station to the first mobile terminal on the resource element corresponding to the data signal of the second mobile terminal;

if the cyclic redundancy check is incorrect, performing the interpolation on the resource block of the first mobile terminal using the channel response estimate value $\hat{h}$, so as to obtain the channel response estimate value from the base station on the resource element corresponding to the data signal of the first mobile terminal to the first mobile terminal.

6. The method according to claim 1, wherein the interpolation comprises any one of linear interpolation, polynomial interpolation, spline interpolation, triangular interpolation, rational interpolation and wavelet interpolation.

7. The method according to claim 1, wherein a detection error probability of the first mobile terminal on the resource element corresponding to the data signal of the second mobile terminal is less than or equal to a preset threshold value.

8. A first mobile terminal, wherein the first mobile terminal is located in a central area of a cell, and the first mobile terminal comprises:

a processor; and a non-transitory processor-readable medium having processor-executable instructions stored thereon, the processor-executable instructions including a plurality of units, the units including:

a first receiving unit, configured to, receive a first signal transmitted by a base station, wherein the first signal is formed by a reference signal transmitted by the base station passing through a channel from the base station to the first mobile terminal;

an estimation unit, configured to, estimate a channel response estimate value $\hat{h}$ from the base station to the first mobile terminal on a resource element corresponding to the first signal, using the first signal and the reference signal;

a first interpolation unit, configured to, perform interpolation on a resource block of a second mobile terminal using the channel response estimate value $\hat{h}$, so as to obtain a coarse channel response estimate value $\hat{h}$ from the base station to the first mobile terminal on a resource element corresponding to a data signal of the second mobile terminal, wherein the second mobile terminal is located in an edge area of the cell, and the resource block of the second mobile terminal is adjacent to a resource block of the first mobile terminal;

the first receiving unit is further configured to, receive a second signal transmitted by the base station, wherein the second signal is formed by the data signal of the second mobile terminal transmitted by the base station passing through the channel from the base station to the first mobile terminal on the resource element corresponding to the data signal of the second mobile terminal;

a demodulating and decoding unit, configured to demodulate, decode and recover the data signal of the second mobile terminal, from the second signal received by the first receiving unit;

an updating unit, configured to, set the data signal of the second mobile terminal as a new reference signal, and, in combination with the second signal, update the coarse channel response estimate value h', so as to obtain a fine channel response estimate value h" from the base station to the first mobile terminal on the resource element corresponding to the data signal of the second mobile terminal;

a second interpolation unit, configured to perform the interpolation on the resource block of the mobile terminal using the channel response estimate value $\hat{h}$ and the estimated fine channel response value h", so as to obtain a channel response estimate value from the base station to the first mobile terminal on a resource element corresponding to a data signal of the first mobile terminal.

9. The first mobile terminal according to claim 8, further comprising:

a second receiving unit, configured to, receive a first control message sent by the base station, wherein the first control message carries modulation and coding information of the second mobile terminal;

an analysis unit, configured to, analyze the first control message to obtain the modulation and coding information of the second mobile terminal and output to the demodulating and decoding unit;

the demodulating and decoding unit is a further configured to demodulate and decode data corresponding to the data signal of the second mobile terminal, from the second signal received by the first receiving unit, using the modulation and encoding information, and, according to the demodulated and decoded data, recover the data signal of the second mobile terminal which has been transmitted from the base station to the second mobile terminal.

10. The first mobile terminal according claim 9, wherein the analysis unit is further configured to analyze cyclic redundancy check information of the second mobile terminal from the first control message;

the first mobile terminal further comprises:

a check unit, configured to perform cyclic redundancy check on the data signal of the second mobile terminal demodulated, decoded and recovered by the demodulating and decoding unit using the cyclic redundancy check information;

if the cyclic redundancy check is correct, inform the updating unit to take the data signal of the second mobile terminal as the new reference signal, and, in combination with the second signal, update the coarse channel response estimate value h' so as to obtain the fine channel response estimate value h" from the base station to the first mobile terminal on the resource element corresponding to the data signal of the second mobile terminal;

if the cyclic redundancy check is incorrect, inform the first interpolation unit to use the channel response estimate value ĥ to perform the interpolation on the resource block of the first mobile terminal, so as to obtain the channel response estimate value from the base station to the first mobile terminal on the resource element corresponding to the data signal of the first mobile terminal.

11. The first mobile terminal according to claim 8, further comprising:

a third receiving unit, configured to, receive a second control message sent by the base station, wherein the second control message carries scrambling code information of the second mobile terminal;

a descrambling unit, configured to, descramble a physical downlink control signal of the second mobile terminal using the scrambling code information, so as to obtain the modulation and encoding information of the second mobile terminal and output to the demodulating and decoding unit;

the demodulating and decoding unit is further configured to demodulate and decode data corresponding to the data signal of the second mobile terminal, from the second signal received by the first receiving unit, using the modulation and encoding information, and, according to the demodulated and decoded data, recover the data signal of the second mobile terminal which has been transmitted from the base station to the second mobile terminal.

12. The first mobile terminal according to claim 11, wherein the descrambling unit is further configured to descramble the physical downlink control signal of the second mobile terminal to obtain cyclic redundancy check information of the second mobile terminal using the scrambling code information;

the first mobile terminal further comprises:

a check unit, configured to perform cyclic redundancy check on the data signal of the second mobile terminal demodulated, decoded and recovered by the demodulating and decoding unit using the cyclic redundancy check information;

if the cyclic redundancy check is correct, inform the updating unit to take the data signal of the second mobile terminal as the new reference signal, and, in combination with the second signal, update the coarse channel response estimate value h', so as to obtain the fine channel response estimate value h" from the base station to the first mobile terminal on the resource element corresponding to the data signal of the second mobile terminal;

if the cyclic redundancy check is incorrect, inform the first interpolation unit to perform the interpolation on the resource block of the first mobile terminal using the channel response estimate value ĥ, so as to obtain the channel response estimate value from the base station to the first mobile terminal on the resource element corresponding to the data signal of the first mobile terminal.

13. The first mobile terminal according to claim 8, wherein the interpolation comprises any one of linear interpolation, polynomial interpolation, spline interpolation, triangular interpolation, rational interpolation and wavelet interpolation.

14. The first mobile terminal according to claim 8, wherein a detection error probability of the first mobile terminal on the resource element of the second mobile terminal for transmitting the data signal is less than or equal to a preset threshold value.

15. A downlink channel estimation system, comprising: a base station, and a first mobile terminal, which is located in a central area of a cell;

wherein the base station is configured to transmit a reference signal, wherein the reference signal, after passing through a channel from the base station to the first mobile terminal, forms a first signal; and transmit a data signal of a second mobile terminal, wherein the data signal of the second mobile terminal, after passing through the channel from the base station to the first mobile terminal on a resource element corresponding to the data signal of the second mobile terminal, forms a second signal;

wherein the first mobile terminal comprises a processor and a non-transitory processor-readable medium having processor-executable instructions stored thereon, the processor-executable instructions including a plurality of units, the units including:

a first receiving unit, configured to, receive the first signal transmitted by the base station;

an estimation unit, configured to, estimate a channel response estimate value ĥ from the base station to the first mobile terminal on a resource element corresponding to the first signal, using the first signal and the reference signal;

a first interpolation unit, configured to, perform interpolation on a resource block of a second mobile terminal using the channel response estimate value ĥ, so as to obtain a coarse channel response estimate value h' from the base station to the first mobile terminal on the resource element corresponding to the data signal of the second mobile terminal, wherein the second mobile terminal is located in an edge area of the cell, and the resource block of the second mobile terminal is adjacent to a resource block of the first mobile terminal;

the first receiving unit is further configured to, receive the second signal transmitted by the base station;

a demodulating and decoding unit, configured to demodulate, decode and recover the data signal of the second mobile terminal, from the second signal received by the first receiving unit;

an updating unit, configured to, set the data signal of the second mobile terminal as a new reference signal, and, in combination with the second signal, update the coarse channel response estimate value h', so as to obtain a fine channel response estimate value h" from the base station to the first mobile terminal on the resource element corresponding to the data signal of the second mobile terminal;

a second interpolation unit, configured to perform the interpolation on the resource block of the mobile terminal using the channel response estimate value $\hat{h}$ and the estimated fine channel response value h", so as to obtain a channel response estimate value from the base station to the first mobile terminal on a resource element corresponding to a data signal of the first mobile terminal.

16. The system according to claim 15, wherein
the base station is also configured to send a first control message to the first mobile terminal, wherein the first control message carries modulation and encoding information of the second mobile terminal.

17. The system according to claim 16, wherein the first control message carries cyclic redundancy check information of the second mobile terminal.

18. The system according to claim 15, wherein
the base station is further configured to send a second control message to the first mobile terminal, wherein the second control message carries scrambling code information of the second mobile terminal.

19. The system according to claim 15, wherein a detection error probability of the first mobile terminal on the resource element corresponding to the data signal of the second mobile terminal is less than or equal to a preset threshold value.

\* \* \* \* \*

UNITED STATES PATENT AND TRADEMARK OFFICE
CERTIFICATE OF CORRECTION

PATENT NO. : 9,210,003 B2  
APPLICATION NO. : 14/290350  
DATED : December 8, 2015  
INVENTOR(S) : Liu et al.

Page 1 of 1

It is certified that error appears in the above-identified patent and that said Letters Patent is hereby corrected as shown below:

Claims

Column 20, line 66, claim 9, "is a further" should read -- is further --.

Signed and Sealed this  
Twenty-second Day of March, 2016

Michelle K. Lee  
*Director of the United States Patent and Trademark Office*